United States Patent
Maiwald et al.

(10) Patent No.: US 9,507,444 B2
(45) Date of Patent: Nov. 29, 2016

(54) METHOD FOR OPERATING AN OPERATING DEVICE FOR A MOTOR VEHICLE

(71) Applicant: AUDI AG, Ingolstadt (DE)

(72) Inventors: Stefan Maiwald, Ingolstadt (DE); Joachim Krug, Riedenburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/435,277

(22) PCT Filed: Jun. 12, 2013

(86) PCT No.: PCT/EP2013/001732
§ 371 (c)(1),
(2) Date: Apr. 13, 2015

(87) PCT Pub. No.: WO2014/056556
PCT Pub. Date: Apr. 17, 2014

(65) Prior Publication Data
US 2015/0253876 A1    Sep. 10, 2015

(30) Foreign Application Priority Data
Oct. 12, 2012    (DE) .................. 10 2012 019 995

(51) Int. Cl.
*H03K 17/94* (2006.01)
*G06F 3/0362* (2013.01)
(Continued)

(52) U.S. Cl.
CPC ............. *G06F 3/0362* (2013.01); *G01D 5/245* (2013.01); *G01D 5/3473* (2013.01)

(58) Field of Classification Search
CPC .. G01D 5/245; G01D 5/3473; G06F 3/0362; B60K 2350/102; B60K 37/06
See application file for complete search history.

(56) References Cited

U.S. PATENT DOCUMENTS

| | | | |
|---|---|---|---|
| 6,265,866 | B1 | 7/2001 | Ludwig et al. |
| 8,362,764 | B2 | 1/2013 | Peukert et al. |

(Continued)

FOREIGN PATENT DOCUMENTS

| | | |
|---|---|---|
| CN | 102498367 | 6/2012 |
| DE | 4438880 | 5/1996 |

(Continued)

OTHER PUBLICATIONS

WIPO English Language Translation of the International Preliminary Report on Patentability for PCT/EP2013/001732, mailed on Apr. 23, 2015, 6 pages.

(Continued)

*Primary Examiner* — Omeed Alizada
(74) *Attorney, Agent, or Firm* — Staas & Halsey LLP

(57) ABSTRACT

A method for operates an operator control device for a motor vehicle. The operator control device has a rotary actuator which is rotatably mounted on a holding element, and a coding element, by detecting a first actual sensor value using coding of the coding element in the current rotational position of the rotary actuator. The method involves determining a current rotational angle between the rotary actuator and the holding element on the basis of the detected first actual sensor value, respectively providing at least one setpoint sensor value at predetermined rotational angles between the rotary actuator and the holding element, assigning the detected first actual sensor value to one of the at least one setpoint sensor valves, and adapting the first actual sensor value to the setpoint sensor value, assigned thereto, for the determination of the current rotational angle.

15 Claims, 3 Drawing Sheets

(51) Int. Cl.
*G01D 5/245* (2006.01)
*G01D 5/347* (2006.01)

(56) References Cited

U.S. PATENT DOCUMENTS

| | | | |
|---|---|---|---|
| 2007/0095634 A1* | 5/2007 | Misuda | G01D 5/252 |
| | | | 200/11 R |
| 2010/0057273 A1 | 3/2010 | Heers et al. | |
| 2012/0056761 A1 | 3/2012 | Sano | |
| 2012/0181958 A1 | 7/2012 | Chabaud | |
| 2013/0033463 A1 | 2/2013 | Geyl | |

FOREIGN PATENT DOCUMENTS

| | | |
|---|---|---|
| DE | 19915988 | 10/2000 |
| DE | 102005055307 | 1/2007 |
| DE | 102006060808 | 6/2008 |
| DE | 102008000943 | 10/2009 |
| DE | 102009028170 | 2/2011 |
| DE | 102009051730 | 5/2011 |
| DE | 102010056271 | 6/2012 |
| DE | 102012019995.3 | 10/2012 |
| EP | 1146409 | 10/2001 |
| EP | 1674831 | 6/2006 |
| FR | 2958761 | 10/2011 |
| WO | PCT/EP2013/001732 | 6/2013 |

OTHER PUBLICATIONS

German Office Action for German Priority Patent Application No. 10 2012 019 995.3, issued Feb. 27, 2013, 6 pages.
English language International Search Report for PCT/EP2013/001732, mailed Sep. 4, 2013, 2 pages.
Chinese Office Action for related Chinese Patent Application No. 201380019545.0, issued Oct. 10, 2015, 6 pages.
Examination Report mailed Apr. 29, 2016 in European Patent Application No. 13 730 111.5, 4 pages.

* cited by examiner

METHOD FOR OPERATING AN OPERATING DEVICE FOR A MOTOR VEHICLE

CROSS REFERENCE TO RELATED APPLICATIONS

This application is based on and hereby claims priority to International Application No. PCT/EP2013/001732 filed on Jun. 12, 2013 and German Application No. 10 2012 019 995.3 filed on Oct. 12, 2012, the contents of which are hereby incorporated by reference.

BACKGROUND

The present invention relates to a method for operating an operator control device for a motor vehicle. Furthermore, the present invention relates to an operator control device for a motor vehicle.

Appropriate operator control devices are provided for operating functional devices of a motor vehicle. Said operator control devices can comprise a rotary actuator or rotary encoder. Contemporary rotary actuators have mechanical latching positions in which they latch along their rotational direction. These latching positions are perceived haptically by the user or by the operator. Such rotary manual actuators have been in use millions of times for years and are employed, for example, as volume adjusters, in air conditioning operator control components or in a central input unit in a motor vehicle. The rotary actuators usually have appropriate coding elements which can be detected with a sensor. The coding elements can comprise one or more magnets which are detected with a Hall sensor. Furthermore, the coding elements can be formed by electrical contacts which are contacted by slip contacts. The coding elements can also be formed by corresponding recesses which can be detected with an optical sensor.

In this context, DE 10 2005 055 307 A1 describes a rotary actuator with an incremental rotational angle encoder for use in a motor vehicle. A coding element with periodic cutouts is attached to the shaft of the rotary actuator. Rotating the rotary actuator and the associated rotation of the coding element causes the cutouts to rotate through the detection range of the photoelectric barrier. This causes the analog output voltage of a photosensor to be modulated. An incremental rotational angle of the rotary actuator can be assigned to the profile of the analog output voltage by evaluation electronics.

DE 10 2006 060 808 A1 discloses an angle sensor for detecting the rotational angle of a component with a ring- or circular disk-like magnet. In the region of the magnetic field of the magnet, a Hall element is arranged by which a digital signal which is dependent on the rotational position of the magnet can be generated. In addition, an analog signal of a magneto-resistive sensor element can be assigned, as a function of the digital signal, to a first 180° angular range or to a second 180° angular range, following the first angular range, of a 360° angular range.

Furthermore, US 2012/0056761 A1 describes a rotatable input device for a motor vehicle. An optical or magnetic sensor can be used to detect the rotational angle of the input device.

In addition, US 2010/0057273 A1 discloses a control system for a motor vehicle. The control system has an operator control element which can be embodied as a rotary actuator or pushbutton actuator.

Finally, DE 10 2009 051730 A1 describes a multi-function operator control device of a motor vehicle with a rotary actuator. Arranged on the rotary actuator is at least one magnet which interacts in a contactless fashion with a Hall sensor. Furthermore, a rotational haptic element is provided with which individual latching stages for the rotary actuator are predefined.

SUMMARY

One potential object is to make the operator control of an operator control device, in particular of a rotary actuator, easier and more intuitive.

The inventors propose a method for operating an operator control device for a motor vehicle, wherein the operator control device has a rotary actuator which is rotatably mounted on a holding element, and a coding element, comprises detecting a first actual sensor value using coding of the coding element in the current rotational position of the rotary actuator, determining a current rotational angle between the rotary actuator and the holding element on the basis of the detected first actual sensor value, respectively providing at least one setpoint sensor value at predetermined rotational angles between the rotary actuator and the holding element, assigning the detected first actual sensor value to one of the at least one setpoint sensor values and adapting the first actual sensor value to the setpoint sensor value, assigned thereto, for the determination of the current rotational angle.

The operator control device can be arranged in the dashboard or in the center console of the motor vehicle. The motor vehicle can also comprise a plurality of operator control devices with which functional devices such as, for example, an air conditioning system, a navigation system, an operator control device with an associated display, an entertainment system or the like can be actuated. The operator control device comprises a rotary actuator which can also be embodied as a rotary actuator/pushbutton actuator. The operator control device comprises a coding element which can be arranged, for example, on the rotary actuator. The coding element can be arranged, for example, along the circumferential direction of the rotary actuator or a shaft of the rotary actuator. In addition, the operator control device comprises a sensor device with which coding of the coding element can be detected. The sensor device can, for example, be arranged in a positionally fixed fashion on the holding element or a housing of the operator control device. As a result of the coding of the coding element, at least one actual sensor value is generated in the sensor device. The coding element can comprise, for example, one or more magnets and the sensor device can comprise a Hall sensor. Alternatively, the coding element can have breakthroughs or a predetermined geometry which can be sensed with an optical sensor of the sensor device. The use of sliding contacts is also conceivable.

Four predefined rotational angles of the rotary actuator with respect to the holding element setpoint sensor values can be stored on a storage device of the operator control device. These setpoint sensor values may have been correspondingly detected in advance with a precision rotary encoder for predetermined angles. The setpoint sensor values can also be stored by the manufacturer in the storage device. During operation of the operator control device, an actual sensor value is then detected using the coding of the coding element. This actual sensor value is compared with the setpoint sensor values which are stored in the memory. The actual sensor value is then assigned to the closest setpoint sensor value. The actual sensor value is then adapted to the setpoint sensor value assigned thereto. A corresponding calibration of the actual sensor value can therefore be carried out continuously during operation of the operator control device. By virtue of the adaptation of the actual sensor value to the setpoint sensor value, the current rotational angle can be determined more precisely.

A multiplicity of latching stages are preferably predefined to the rotary actuator in along its rotational direction and the first actual sensor value is assigned to the at least one setpoint sensor value between two of the latching stages. The operator control device can have a latching device with which a plurality of latching stages or latching positions along its rotational direction are predefined to the rotary actuator. These latching positions can be generated mechanically with a latching cam or by appropriate magnets. During the rotation of the rotary actuator, the latter latches in at the latching positions. By virtue of the assignment of the actual sensor value, which is determined using the coding of the coding element, to the setpoint sensor value, the rotational angle between the individual latching stages can then also be detected particularly precisely. The discrete latching positions, which bring about a high-quality operator control sensation for the user as a result of the haptic feedback, are present in the operator control device. Furthermore, slight deflections of the rotary actuator before the latching in at the next latching position can be detected with the sensor device. As a result, in addition to the latching positions the intermediate positions between the latching stages can also be easily detected with high resolution and further processed correspondingly.

In one embodiment, the first actual sensor value is multiplied by a factor and/or an offset is added to the first actual sensor value for the purpose of adaptation. In order to be able to adapt the actual sensor value incrementally to the respective setpoint sensor value during operation of the operator control device, the respective actual sensor value can be multiplied by a factor. Alternatively or additionally, an offset for the actual sensor value can be determined. The actual sensor value can therefore be adapted particularly easily to the setpoint sensor value.

In one embodiment, using the coding of the coding element the first and a second actual sensor value are determined for the predefined rotational position and a first and a second setpoint sensor value are respectively provided at predetermined rotational angles. The operator control device can have two sensor devices which are arranged offset with respect to one another along the rotational direction of the rotary actuator. A first actual sensor value is provided with the first sensor device and a second actual sensor value with the second sensor device using the coding of the coding element. In the storage device of the operator control device, a first and a second setpoint sensor value are predefined for each predetermined rotational angle of the rotary actuator with respect to the holding element. By virtue of the detection of two actual sensor values, the rotational angle between the rotary actuator and the holding element can be detected more precisely.

In one refinement, the first actual sensor value is assigned to the first setpoint sensor value and/or the second actual sensor value is assigned to the second setpoint sensor value. For this purpose, the associated value of the first setpoint sensor value can be plotted with respect to the associated second setpoint sensor value for each predefined rotational angle in a diagram. As a result the measured value pair of the first actual sensor value and the second actual sensor value can easily be assigned to the corresponding pair of the first setpoint sensor value and the second setpoint sensor value.

The first actual sensor value and/or the second actual sensor value are preferably adapted using a difference between the first actual sensor value and the first setpoint sensor value and/or a difference between the second actual sensor value and the second setpoint sensor value. The pair of actual sensor values is compared the corresponding pairs of setpoint sensor values. For this purpose, the distance between the pair of actual sensor values and the respective pairs of setpoint sensor values is determined. The distance is calculated from the sum of the absolute value of the first actual sensor value minus the first setpoint sensor value and the absolute value of the second actual sensor value minus the second setpoint sensor value. In order to determine the distance it is also possible to use other methods such as, for example, a binary search. The sum of the distances squared is also suitable, as are other customary methods for quantifying distance. Given a sufficiently frequent signal evaluation, the smallest distance between the pair of the actual sensor values and the associated pair of the setpoint sensor values is then obtained. In this context, the determination of the distance can always be carried out with the adapted actual sensor values. As a result, the current rotational angle of the rotary actuator can be determined particularly accurately. In addition, fabrication tolerances, temperature influences, the drift of the sensor device or the like can be compensated. As a result of the calibration described here, the actual sensor values are always very close to the setpoint sensor values, and the faults due to the distance method are therefore minimized.

In a further embodiment, the first actual sensor value and/or the second actual sensor value are adapted in a rotational position of the rotary actuator by virtue of the fact that the first actual sensor is in a predefined value range. Firstly, rough calibration of the operator control device is carried out. During the rough calibration the sensor can be arranged, in particular, in such a way that the first actual sensor value and the second actual sensor value have substantially the same value. Such rough calibration can be carried out, for example, at the start of the system in order to determine an overall amplification for adapting the actual sensor values to the setpoint sensor values. The rough calibration is particularly efficient if the first actual sensor value and the second actual sensor value have substantially equal values and a small offset for adapting the actual sensor values is present. In this context, the rough calibration takes place before the use of the rotary actuator. The distance iteration must be terminated before the calibration.

In a further embodiment, the factor is determined during operation of the operator control device in a position of the rotary actuator in which the first actual sensor value or the second actual sensor value are at a maximum. Subsequent to the rough calibration, corresponding fine calibration can be carried out. In the latter, the factor for adapting the first actual sensor values to the setpoint sensor values is firstly determined. The determination of the factor can be carried out during the activation of the operator control device by the user. In the vicinity of a maximum of the first actual sensor value, the rotational angle of the second actual sensor value is broadly determined. The factor for the first actual sensor value can be determined in this range. The factor for the second actual sensor value can be determined analogously.

In a further refinement, the offset is determined during operation of the operator control device in a position of the rotary actuator in which the first actual sensor value or the second actual sensor value are at a minimum. The determination or the calibration of the offset is carried out during the activation of the operator control device by the operator. In a range in which the first actual sensor value is at a minimum, the rotational angle of the second actual sensor value is broadly determined. The offset for the first actual sensor value can be determined in this range. The offset for the second actual sensor value can be determined analogously.

The inventors also propose an operator control device for a motor vehicle, which comprises a rotary actuator which is rotatably mounted on a holding element, a coding element, at least one sensor device for detecting a first actual sensor value using coding of the coding element in the current rotational position of the rotary actuator and a computing device for determining a current rotational angle between the rotary actuator and the holding element on the basis of the detected first actual sensor value, wherein the operator control device has a storage device for respectively providing at least one setpoint sensor value at predetermined rotational angles between the rotary actuator and the holding element, and the computing device is designed to assign the detected first actual sensor value to one of the at least one setpoint sensor values and to adapt the first actual sensor value to the setpoint sensor value assigned thereto, for the determination of the current rotational angle.

The advantages and developments described above in relation to the method can be transferred in a similar way to the operator control device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
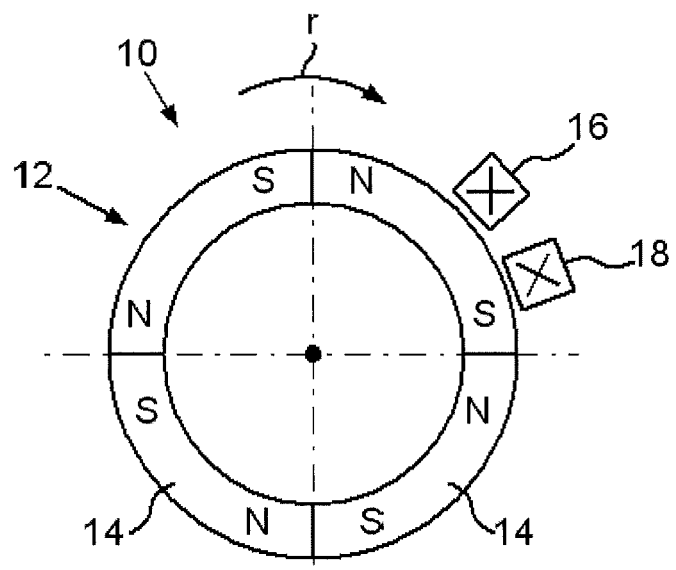
FIG. 1 shows an operator control device for a motor vehicle in a schematic illustration.

Reference will now be made in detail to the preferred embodiments of the present invention, examples of which are illustrated in the accompanying drawings, wherein like reference numerals refer to like elements throughout.

FIG. 1 shows a schematic illustration of an operator control device 10 for a motor vehicle in a plan view. The operator control device 10 is used to perform operator control of a functional device of a motor vehicle. Such a functional device can be an air conditioning system, a navigation system, an operator control device with an associated display, an entertainment system or the like. The operator control device 10 comprises a rotary actuator which is rotatably mounted on a holding element (not illustrated here). The operator control device 10 has a latching device by which a plurality of latching stages are predefined to the rotary actuator along the rotational direction r.

Furthermore, the operator control device 10 comprises a coding element 12. The coding element 12 can be arranged on the rotary actuator. The coding element 12 is formed here by four permanent magnets 14 which are arranged along the circumferential direction of the operator control device 10. Furthermore, the operator control device 10 comprises a first sensor device 16 and a second sensor device 18 which are embodied as Hall sensors in the present example. The distance between the two sensor devices 16, 18 corresponds half the spatial extent of a permanent magnet 14 along the circumferential direction. If the rotary actuator is rotated by an operator, the coding element 12 is also rotated with the rotary actuator. In the two sensor devices 16, 18, a sensor signal is generated as a function of the rotational position of the rotary actuator. The sensor signals have a substantially analog profile since the transition between the magnetization of the North Poles N and of the South Poles S of the permanent magnets 14 is fluid. The sensor signals can be fed to an analog/digital converter, as a result of which a first actual sensor value $x_{act}$ is provided by the first sensor device 16, and a second actual sensor value $y_{act}$ is provided by the second sensor device 18.

Figure 2:
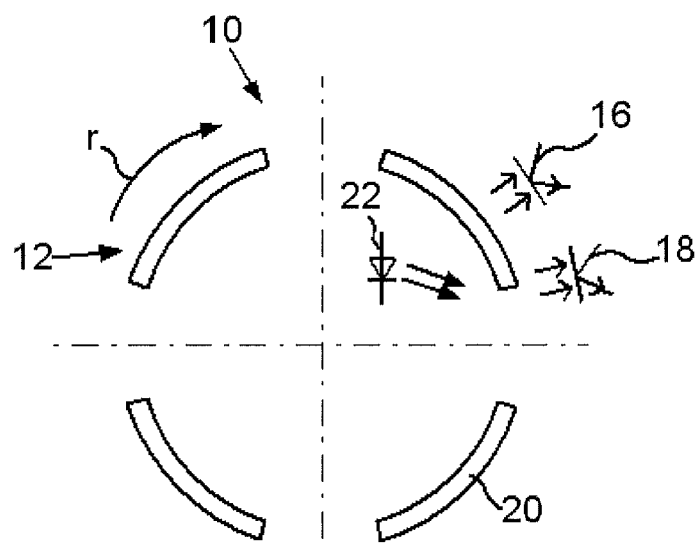
FIG. 2 shows an operator control device for a motor vehicle in a further embodiment.

FIG. 2 shows an operator control device 10 in a further embodiment. Here, the coding element 12 is formed by four segments 20 which are arranged along the circumferential direction of the operator device control 10. In an interior space formed by the segments 20, a lighting element 22 is arranged. The lighting element 22 respectively forms, together with the two sensor devices 16, 18 which are embodied as photosensors in the present example, a photoelectric barrier which is interrupted by the segments 20 when the coding element 12 rotates. A first actual sensor value $x_{act}$ is provided here too by the first sensor device 16, and a second actual sensor value $y_{act}$ is provided by the second sensor device 18.

Figure 3:
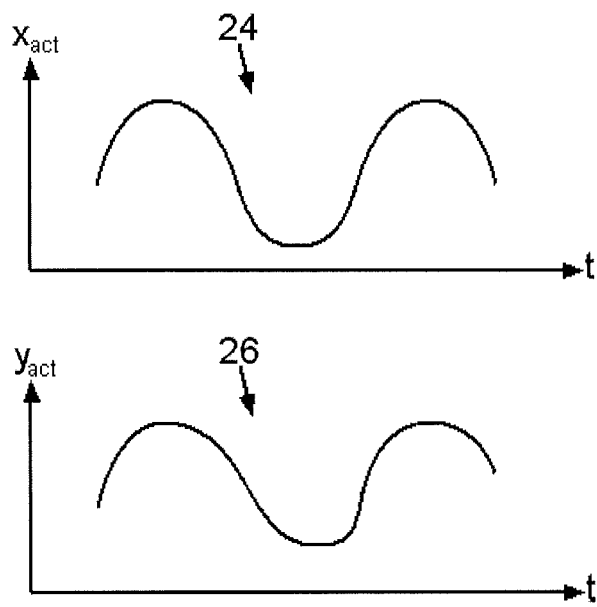
FIG. 3 shows the signals of the first actual sensor values and second actual sensor values as a function of time.

FIG. 3 shows the time profile of the first actual sensor value $x_{act}$ in a first graph 24. The second graph 26 shows the time profile of the second actual sensor value $y_{act}$. The time profile of the first actual sensor values $x_{act}$ and the time profile of the second actual sensor values $y_{act}$ have a substantially sinusoidal profile. In this context, the time profile of the second actual sensor values $y_{act}$ is offset with respect to the profile of the first actual sensor values $x_{act}$.

Figure 4:
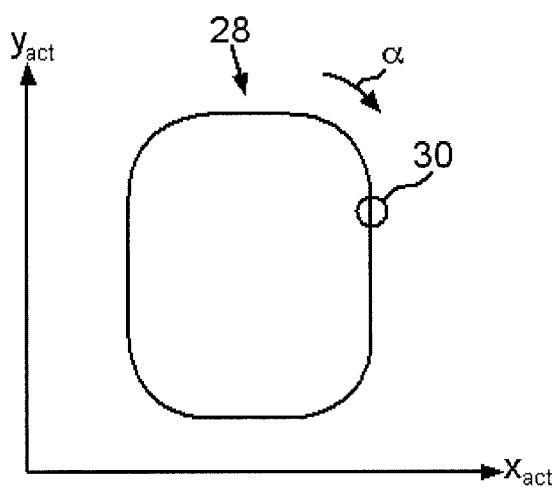
FIG. 4 shows a diagram in which the first actual sensor values are plotted against the second actual sensor values.

FIG. 4 shows a graph 28 in which the second actual sensor values $y_{act}$ are plotted as a function of the first actual sensor values $x_{act}$ for predetermined rotational angles α of the rotary actuator with respect to the holding element. In this context, the actual sensor values $x_{act}$ and $y_{act}$ can be plotted for predefined rotational angles α between two latching stages of the rotary actuator. If the rotary actuator is moved into a specific rotational position, the first sensor device 16 provides a first actual sensor value $x_{act}$, and the second sensor device 18 provides a second actual sensor value $y_{act}$. This is characterized in FIG. 4 by the point 30.

Figure 5:
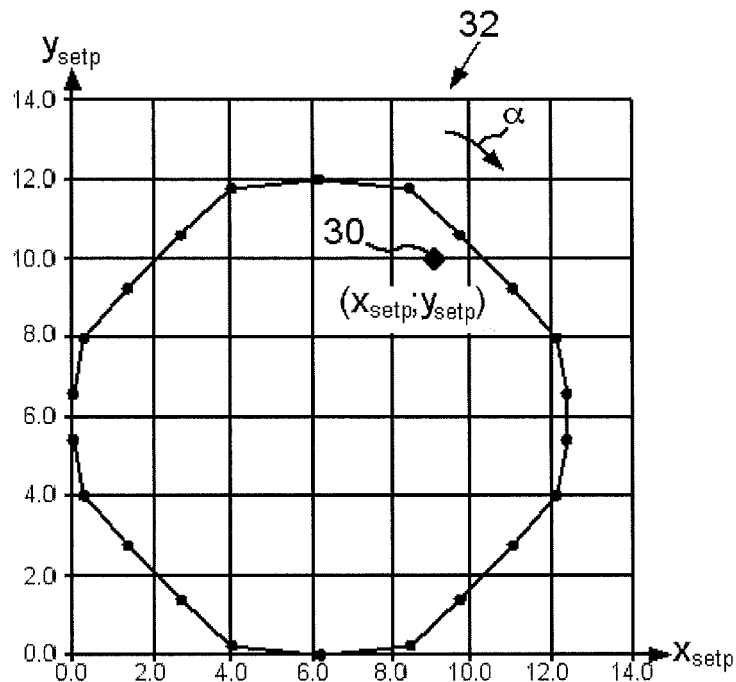
FIG. 5 shows a diagram in which the first setpoint sensor values are plotted against the second setpoint sensor values.

FIG. 5 shows a graph 32 in which second setpoint sensor values $y_{setp}$ are plotted as a function of the first setpoint sensor values $x_{setp}$ for predetermined rotational angles α of the rotary actuator with respect to the holding element. The setpoint sensor values $x_{setp}$ and $y_{setp}$ are determined, for example, using measurements with a rotational angle encoder. The setpoint sensor values $x_{setp}$ and $y_{setp}$ may have been determined for predetermined rotational angles α between two latching stages of the rotary actuator. The point 30, which characterizes the current actual sensor values $x_{act}$ and $y_{act}$ in the current rotational position of the rotary actuator, is also illustrated in the graph 32.

The two actual sensor values $x_{act}$ and $y_{act}$ are then assigned to a pair of setpoint sensor values $x_{setp}$ and $y_{setp}$. For this purpose, the distance between the pair of actual sensor values $x_{act}$ and $y_{act}$ and the instantaneously closest pair of setpoint sensor values $x_{setp}$ and $y_{setp}$ is determined. In this context there is also provision for the determination of the distance of the actual sensor values $x_{act}$ and $y_{act}$ from the two pairs of setpoint sensor values $x_{setp}$ and $y_{setp}$ which lie along the rotational angle α before and after the instantaneously closest pair of setpoint sensor values $x_{setp}$ and $y_{setp}$. The distance can be calculated according to the following formula:

$$\text{Distance} = |x_{act} - x_{setp}| + |y_{act} - y_{setp}|.$$

The pair of actual sensor values $x_{act}$ and $y_{act}$ is then assigned to the pair of setpoint sensor values $x_{setp}$ and $y_{setp}$ which are at the smallest distance from the actual sensor values $x_{act}$ and $y_{act}$. In order to adapt the actual sensor values $x_{act}$ and $y_{act}$ it is possible to multiply the actual sensor values $x_{act}$ and $y_{act}$ by a factor. Alternatively or additionally, an offset can be added to the actual sensor values $x_{act}$ and $y_{act}$.

Figure 6:
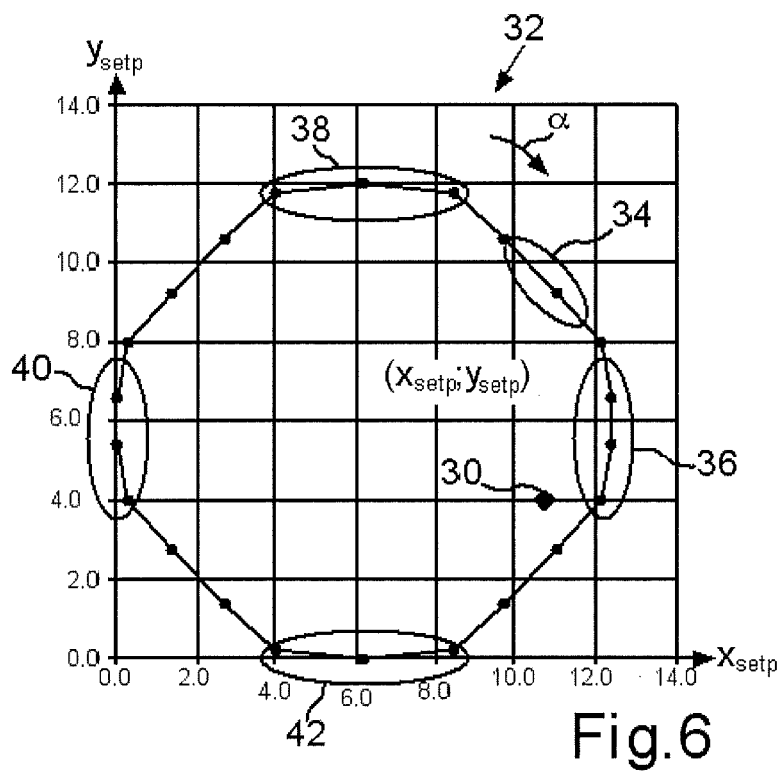
FIG. 6 shows a diagram according to FIG. 5 in a further embodiment.

The adaptation of the actual sensor values $x_{act}$ and $y_{act}$ is illustrated in FIG. 6. Firstly, a rough calibration is performed. The value zero is predefined as a starting value for the offset and the value one is predefined for the factor. The rough calibration is carried out in a position of rest of the operator control element. The rough calibration is preferably carried out when the rotary actuator is in a rotational position in which the actual sensor values $x_{act}$ and $y_{act}$ are substantially the same. This is characterized by the region 34. In this position of the rotary actuator, a factor for adapting the actual sensor values $x_{act}$ and $y_{act}$ can be calculated according to the following formula:

$$\text{Factor} = (x_{setp} + y_{setp})/(x_{act} + y_{act}).$$

Subsequently, factor calibration of the actual sensor values $x_{act}$ and $y_{act}$ takes place. The calibration of the factor takes place during operation of the operator control device 10. Firstly, the factor is calibrated for the first actual sensor value $x_{act}$. This takes place in a rotational position of the rotary actuator in which the first actual sensor value $x_{act}$ is at a maximum. This is characterized in FIG. 6 by the region 36. In this region, the rotational angle α is determined in particular by the second actual sensor value $y_{act}$. The factor is calculated as follows:

$$\text{Factor} = x_{setp}/x_{act}.$$

Subsequently, the factor is calibrated for the second actual sensor value $y_{act}$. This takes place in a rotational position of the rotary actuator in which the second actual sensor value $y_{act}$ is at a maximum. This is characterized by the region 38. In this region, the rotational angle α is determined in particular by the first actual sensor value $x_{act}$.

In addition, the calibration takes place of the offset for the actual sensor values $x_{act}$ and $y_{act}$ which is also performed during operation of the operator control device 10. Firstly, the offset for the first actual sensor value $x_{act}$ is calibrated. This takes place in a rotational position of the rotary actuator in which the first actual sensor values $x_{act}$ is at a minimum. This is characterized by the region 40. In this region, the rotational angle α is determined in particular by the second actual sensor value $y_{act}$. The offset is calculated according to the following formula:

$$\text{Offset} = x_{setp} - x_{act}.$$

Subsequently, the offset for the second actual sensor value $y_{act}$ is calibrated. This takes place in a rotational position of the rotary actuator in which the second actual sensor value $y_{act}$ is at a minimum. This is characterized by the region 42. In this region, the rotational angle α is determined in particular by the first actual sensor value $x_{act}$.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating an operator control device for a motor vehicle, the operator control device having a rotary actuator which is rotatably mounted on a holding element, and a coding element, the method comprising:

detecting first and second actual sensor values by sensing a coding of the coding element in a current rotational position of the rotary actuator;

providing first and second setpoint sensor values at each of a plurality of predetermined rotational angles between the rotary actuator and the holding element;

assigning the first and second actual sensor values respectively to the first and second setpoint sensor values at one of the predetermined rotational angles;

adapting the first and second actual sensor values respectively to the first and second setpoint sensor values to respectively produce adapted first and second actual sensor values; and determining a current rotational angle between the rotary actuator and the holding element based on the adapted first and second actual sensor values, wherein the first and second actual sensor values correspond to a first plot of x and y values, the first and second setpoint sensor values correspond to a second plot of x and y values, the first actual sensor value and the second actual sensor value are adapted in a rough calibration, for the rough calibration, the current rotational position of the rotary actuator is set so that the first actual sensor value and the second actual sensor value are substantially the same, for the rough calibration, a factor is determined to increase or decrease the first and second actual sensor values, the factor corresponding to the distance between the first and second plots, the first and second actual sensor values are adapted by multiplying each of the first and second actual sensor values by the factor, for a factor calibration of the first actual sensor value, the operator control device is in a rotational position in which the first actual sensor value is at a maximum, the factor for the first actual sensor value is calibrated to close a distance between the first actual sensor value and the first setpoint sensor value assigned thereto, for a factor calibration of the second actual sensor value, the operator control device is in a rotational position in which the second actual sensor value is at a maximum, the factor for the second actual sensor value is calibrated to close a distance between the second actual sensor value and the second setpoint sensor value assigned thereto, for adaptation, an offset is added to the first and second actual sensor values, the offset for the first actual sensor value is determined when the operator control device is in a rotational position in which the first actual sensor value is at a minimum, and the offset for the second actual sensor value is determined when the operator control device is in a rotational position in which the second actual sensor value is at a minimum.

2. The method as claimed in claim 1, wherein the rough calibration takes place when the rotary actuator is in a position of rest, before the rotary actuator is in use, and factor calibration and adaptation are carried out during activation of the operator control device.

3. A method for operating an operator control device for a motor vehicle, the operator control device having a rotary actuator which is rotatably mounted on a holding element, and a coding element, the method comprising:

detecting first and second actual sensor values by sensing a coding of the coding element in a current rotational position of the rotary actuator;

providing a pair of setpoint sensor values at each of a plurality of predetermined rotational angles between the rotary actuator and the holding element;

assigning the first and second actual sensor values to at least one pair of setpoint sensor values corresponding to at least one of the predetermined rotational angles;

determining at least two differences by determining how the first and second actual sensor values respectively differ from the at least one pair of setpoint sensor values;

based on the at least two differences, adapting the first and second actual sensor values to the at least one pair of setpoint sensor values to produce an adapted output; and determining a current rotational angle between the rotary actuator and the holding element based on the adapted output.

4. The method as claimed in claim 3, wherein a multiplicity of latching stages are predefined for the rotary actuator along its rotational direction, and the current rotational angle is determined at a rotational angle between two of the latching stages.

5. The method as claimed in claim 3, wherein a first sensor senses the coding of the coding element and produces the first actual sensor value, and a second sensor senses the coding of the coding element and produces the second actual sensor value.

6. The method as claimed in claim 3, wherein the coding of the coding element is produced by a plurality of permanent magnets circumferentially provided with respect to the rotary actuator such that the poles of each permanent magnet are provided at different rotational angles, and the second sensor is offset from the first sensor with respect to a rotational direction of the rotary actuator.

7. The method as claimed in claim 3, wherein each pair of setpoint sensor values comprises a first setpoint sensor value and a second setpoint sensor value, and the first actual sensor value is adapted using a difference between the first actual sensor value and at least one first setpoint sensor value and/or the second actual sensor value is adapted using a difference between the second actual sensor value and at least one second setpoint sensor value.

8. The method as claimed in claim 3, wherein each pair of setpoint sensor values comprises a first setpoint sensor value and a second setpoint sensor value, and when the setpoint sensor values are determined, the current rotational position of the rotary actuator is set so that the first actual sensor value and the second actual sensor value are each in a predefined value range.

9. A method for operating an operator control device for a motor vehicle, the operator control device having a rotary actuator which is rotatably mounted on a holding element, and a coding element, the method comprising:

detecting a first actual sensor value by sensing a coding of the coding element in a current rotational position of the rotary actuator;

providing at least one setpoint sensor value at each of a plurality of predetermined rotational angles between the rotary actuator and the holding element;

assigning the first actual sensor value to the setpoint sensor value at one of the predetermined rotational angles;

adapting the first actual sensor value to the setpoint sensor value to produce an adapted first actual sensor value; and determining a current rotational angle between the rotary actuator and the holding element based on the adapted first actual sensor value, wherein using the coding of the coding element, the first actual sensor value and a second actual sensor value are detected in the current rotational position of the rotary actuator, first and second setpoint sensor values are respectively provided at each of the plurality of predetermined rotational angles between the rotary actuator and the holding element, the first actual sensor value and the second actual sensor value are adapted in a rough calibration, and for the rough calibration, the current rotational position of the rotary actuator is set so that the first actual sensor value and the second actual sensor value are substantially the same.

10. The method as claimed in claim 9, wherein the first and second actual sensor values correspond to a first plot of x and y values, the first and second setpoint sensor values correspond to a second plot of x and y values, and for the rough calibration, a factor is determined to increase or decrease the first and second actual sensor values, the factor corresponding to the distance between the first and second plots.

11. An operator control device for a motor vehicle, comprising:

a holding element;

a rotary actuator which is rotatably mounted on the holding element;

a coding element rotatable with the rotary actuator;

at least one sensor device to detect first and second actual sensor values using coding of the coding element, the first and second actual sensor values being detected in a current rotational position of the rotary actuator;

a storage device to store a pair of setpoint sensor values at each of a plurality of predetermined rotational angles between the rotary actuator and the holding element; and a computing device:

to assign the first and second actual sensor values to at least one pair of setpoint sensor values corresponding to at least one of the predetermined rotational angles, to determine at least two differences by determining how the first and second actual sensor values respectively differ from the at least one pair of setpoint sensor values, to adapt the first and second actual sensor values, based on the at least two differences, to the at least one pair of setpoint sensor values assigned thereto, to produce an adapted output, and to determine a current rotational angle between the rotary actuator and the holding element based on the adapted output.

12. The method as claimed in claim 3, wherein providing the pair of setpoint sensor values at each of the plurality of predetermined rotational angles comprises:

using the coding of the coding element to determine the first and second actual sensor values at each of the predetermined rotational angles; and determining a first setpoint sensor value and a second setpoint sensor value at each of the predetermined rotational angles based on the respective first and second actual sensor values.

13. The method as claimed in claim 12, wherein for providing the pair of setpoint sensor values at each of the plurality of predetermined rotational angles, the first actual sensor value is assigned to the first setpoint sensor value and/or the second actual sensor value is assigned to the second setpoint sensor value.

14. The method as claimed in claim 12, wherein in providing the pair of setpoint sensor values at each of the plurality of predetermined rotational angles, at least one of the first and second sensor values has a predefined value output range.

15. The method as claimed in claim 3, wherein the pair of setpoint sensor values are provided at each of the plurality of predetermined rotational angles based on measurements at rotational angles where the first actual sensor value or the second actual sensor value is known to be at a maximum or a minimum.

\* \* \* \* \*